US009464897B2

United States Patent
Kim et al.

(10) Patent No.: US 9,464,897 B2
(45) Date of Patent: Oct. 11, 2016

(54) APPARATUS FOR DRIVING GYRO SENSOR AND CONTROL METHOD THEREOF

(71) Applicant: SAMSUNG ELECTRO-MECHANICS CO., LTD., Suwon-Si (KR)

(72) Inventors: Sung Tae Kim, Suwon-si (KR); Young Kil Choi, Suwon-si (KR); Jun Kyung Na, Suwon-si (KR); Seung Chul Pyo, Suwon-si (KR); Chang Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 309 days.

(21) Appl. No.: 14/334,594

(22) Filed: Jul. 17, 2014

(65) Prior Publication Data

US 2015/0020589 A1  Jan. 22, 2015

(30) Foreign Application Priority Data

Jul. 19, 2013   (KR) .................. 10-2013-0085610

(51) Int. Cl.
*G01P 3/44*     (2006.01)
*G01C 19/5776*  (2012.01)

(52) U.S. Cl.
CPC .................. *G01C 19/5776* (2013.01)

(58) Field of Classification Search
CPC ................................. G01C 19/5776
See application file for complete search history.

(56) References Cited

U.S. PATENT DOCUMENTS

2015/0177775 A1* 6/2015 Beaulation ............... G06F 1/04
                                                     327/160
2015/0276407 A1* 10/2015 Bhandari ............... G01P 15/18
                                                     73/504.12
2016/0109258 A1* 4/2016 Boser .................. G01C 19/5726
                                                     73/504.12

FOREIGN PATENT DOCUMENTS

JP    2009-508129 A    2/2009
WO    2007/031403 A1   3/2007

\* cited by examiner

*Primary Examiner* — David Gray
*Assistant Examiner* — Dennis Hancock
(74) *Attorney, Agent, or Firm* — NSIP Law (57) ABSTRACT

Disclosed herein is an apparatus for driving a gyro sensor including a driving displacement signal processing unit, a sensing signal processing unit and an automatic quadrature signal controller configured to control the variable resistor through digital correction when a quadrature signal exists, and minimize an amplitude of the quadrature signal.

17 Claims, 7 Drawing Sheets

APPARATUS FOR DRIVING GYRO SENSOR AND CONTROL METHOD THEREOF

CROSS REFERENCE TO RELATED APPLICATION

This application claims the benefit of Korean Patent Application No. 10-2013-0085610, filed on Jul. 19, 2013, entitled "Apparatus and Method for Driving Gyro Sensor", which is hereby incorporated by reference in its entirety into this application.

BACKGROUND OF THE INVENTION

1. Technical Field

The present invention relates to an apparatus for driving a gyro sensor and a control method thereof.

2. Description of the Related Art

Recently, mobile devices equipped with a gyro sensor (an accelerometer, an angular velocity (gyro) sensor, or a terrestrial magnetism sensor, and the like) using inertial input applied from the outside have been launched. Among the various gyro sensors, a gyro sensor measures an angular velocity by detecting an amount of applied rotatory power of an object. An angular velocity may be obtained by Coriolis' force "F=2 mΩV" wherein m is mass of a sensor Mass, Ω is an angular velocity desired to be measured, and V is a motion velocity of the sensor Mass.

Gyro sensors are commonly used for attitude control in aircraft, rockets, robots, and the like, and for image stabilization (or hand-shaking correction) in cameras, binoculars, and the like. Recently, gyro sensors have been installed in smart phones, and in order to smoothly perform the foregoing function, gyro sensors are required to have a high signal-to-noise ratio (SNR).

Thus, in order to increase an SNR of a gyro sensor, an output signal from a gyro sensor should be large and noise related to a control circuit of the gyro sensor controlling the output signal should be small. Conventionally, as described in the related art document below, a gyro sensor cannot secure a high SNR due to noise generated as a quadrature signal (i.e., a signal due to mismatch of components generated during the process of manufacturing a gyro sensor) and jitter (phase noise) of a synchronous detection clock in connection with the control circuit are mixed.

Also, ideally, a considerable portion of the quadrature signal may be removed through a synchronous detection circuit (or a demodulator), but noise is generated by the quadrature signal due to a change in PVT of the control circuit or a degradation of the gyro sensor.

PRIOR ART DOCUMENT (Patent Document 1) 2009-508129 JP

SUMMARY OF THE INVENTION

The present invention has been made in an effort to provide an apparatus for driving a gyro sensor capable of minimizing a quadrature signal by adjusting a variable resistance value of a variable resistor module through digital PID controlling by an automatic quadrature signal controller to thus secure a signal-to-noise ratio with respect to an output signal from a gyro sensor, and a control method thereof.

According to a preferred embodiment of the present invention, there is provided an apparatus for driving a gyro sensor, including: a driving displacement signal processing unit configured to receive first and second driving displacement signals from a gyro sensor, generate first and second clock signals by using the first and second driving displacement signals, and subsequently apply a driving signal generated by using the second clock signal to the gyro sensor; a sensing signal processing unit configured to receive first and second sensing signals from the gyro sensor, generate third and fourth sensing signals by mixing the first and second sensing signals and the first and second displacement signals by using a variable resistor such that a quadrature signal included in the first and second sensing signals is reduced, and detect a gyro signal from the third and fourth sensing signals; and an automatic quadrature signal controller configured to determine whether a quadrature signal exists in the third and fourth sensing signals, control the variable resistor through digital correction when a quadrature signal exists, and minimize an amplitude of the quadrature signal.

The driving displacement signal processing unit may generate the first clock signal phase-locked to the first driving displacement signal and the second clock signal obtained by shifting a phase of the first driving displacement signal by 90°, through a comparator.

The quadrature signal may include a first quadrature signal and a second quadrature signal, wherein the first quadrature signal may be mixed with the second driving displacement signal having a phase difference of 180° therebetween and the second quadrature signal may be mixed with the first driving displacement signal having a phase difference of 180° therebetween.

The apparatus may further include: a sign selection module provided between the driving displacement signal processing unit and the sensing signal processing unit and configured to provide control such that the driving displacement signal and the quadrature signal mixed through the variable resistor has a phase difference of 180° therebetween.

When a quadrature signal exists, the automatic quadrature controller may control the variable resistance value through proportional integral control (PID).

The driving displacement signal processing unit may include: a first charge amplifier configured to convert the first and second driving displacement signals output from the gyro sensor into voltage signals, amplify the voltage signals, and subsequently output the same; a first clock generation module configured to output the first clock signal phase-locked to the first driving displacement signal through a comparator by using the first and second driving displacement signals; a phase conversion module configured to shift a phase of the first driving displacement signal by 90°; a second clock generation module configured to generate the second clock signal through a comparator by using a signal obtained by shifting the phase of the first driving displacement signal by 90° and a pre-set reference voltage; a first signal conversion module configured to determine an amplitude (voltage) with respect to a driving signal to be applied to the gyro sensor; and a driving signal generation module configured to generate a driving signal to be applied to the gyro sensor by using the second clock signal and the amplitude (voltage) with respect to the driving signal.

The first clock generation module may be a comparator having a non-inverting terminal to which the first driving displacement signal is input and an inverting terminal to which the second driving displacement signal is input, and the second clock generation module may be a comparator having a non-inverting terminal to which the signal obtained by shifting the phase of the first driving displacement signal by 90° is input and an inverting terminal to which the pre-set reference voltage is input.

The sensing signal processing unit may include: a first charge amplifier configured to convert the first and second sensing signals output from the gyro sensor into voltage signals, amplifying the voltage signals, and subsequently output the same; a variable resistor module configured to output third and fourth sensing signals obtained by mixing the first and second driving displacement signals to the first and second sensing signals by using a variable resistor circuit; a second synchronous detection module configured to perform a demodulation process of mixing the third and fourth sensing signals and the second clock signal, respectively, to detect first and second gyro signals in a predetermined DC value form; and a third signal conversion module configured to convert the first and second gyro signals into digital values.

The automatic quadrature signal controller may include: a first synchronous detection module configured to perform a demodulation process of mixing the third and fourth sensing signals with the first clock signal, respectively, to detect first and second quadrature compensation signals; a third signal conversion module configured to convert the first and second quadrature compensation signals into digital values; and a quadrature control module configured to compare the digital values with a pre-set target value, and adjust a variable resistance value of the variable resistor circuit through PID when the digital values have not reached the target value.

The second synchronous detection module may include a first filter module configured to filter noise included in the first and second gyro signals.

The first synchronous detection module may include a second filter module configured to filter noise included in the first and second quadrature compensation signals.

The variable resistor module may include: a first variable resistor circuit configured to include a first variable resistor and a first resistor connected in parallel and output a current based on the third sensing signal obtained by mixing a current based on the first driving displacement signal flowing in the first variable resistor and a current based on the second sensing signal flowing in the first resistor; a second variable resistor circuit configured to include a second variable resistor and a second resistor connected in parallel and output a current based on the fourth sensing signal obtained by mixing a current based on the second driving displacement signal flowing in the second variable resistor and a current based on the first sensing signal flowing in the second resistor; and a voltage holding circuit provided between the first and second variable resistor circuits and maintaining the same voltage in an i node of the first variable resistor circuit and a k node of the second variable resistor circuit.

According to another preferred embodiment of the present invention, there is also provided a method for driving a gyro sensor, including: receiving first and second displacement signals from a gyro sensor and generating first and second clock signals by using the driving displacement signals; receiving first and second sensing signals from the gyro sensor and mixing the first and second sensing signals with the first and second driving displacement signals by using a variable resistor to generate third and fourth sensing signals; determining whether a quadrature signal exists in the third and fourth sensing signals, and when a quadrature signal exists, comparing the quadrature signal with a pre-set target value, and controlling the variable resistance value through digital correction; and detecting first and second gyro signals from the third and fourth sensing signals.

The generating of the first and second clock signals may include: generating the first clock signal phase-locked to the first driving displacement signal, through a comparator; shifting a phase of the first driving displacement signal by 90°; and generating the second clock signal by using the phase-shifted signal and a pre-set reference voltage, through the comparator.

The generating of the third and fourth sensing signals may include: generating the third sensing signal by mixing the first displacement signal and the second sensing signal, through the first variable resistor circuit; and generating the fourth sensing signal by mixing the second driving displacement signal and the first sensing signal, through the second variable resistor circuit.

The determining whether a quadrature signal exists and controlling a variable resistance value may include: detecting the first and second quadrature compensation signals by mixing the third and fourth sensing signals and the first clock signal; converting the first and second quadrature compensation signals into digital values; comparing the digital values with a pre-set target value; and when the digital values are greater than the target value, adjusting the variable resistance value through digital correction using proportional integral control (PID).

The detecting of the first and second gyro signals from the third and fourth sensing signals may include: mixing the second clock signal to the third and fourth sensing signals, respectively, to detect first and second gyro signals in a predetermined DC value form; and converting the first and second gyro signals into digital values.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The objects, features, and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side", and the like, are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings, and a driving displacement signal, a sensing signal, a quadrature signal, and a gyro signal may be represented in the form of a voltage or a current.

Figure 1:
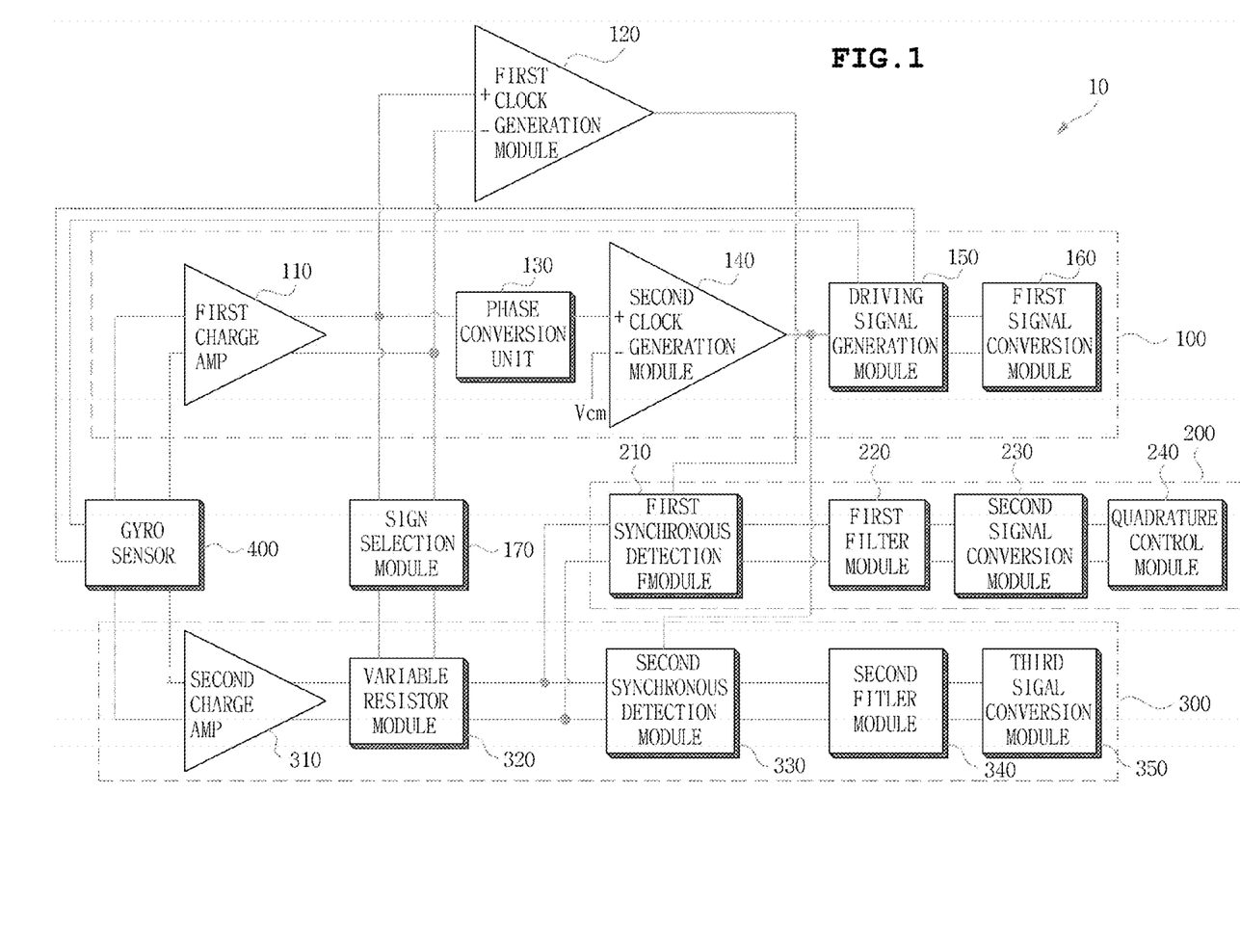
FIG. 1 is a block diagram of an apparatus for driving a gyro sensor according to an embodiment of the present invention.
Figure 2:
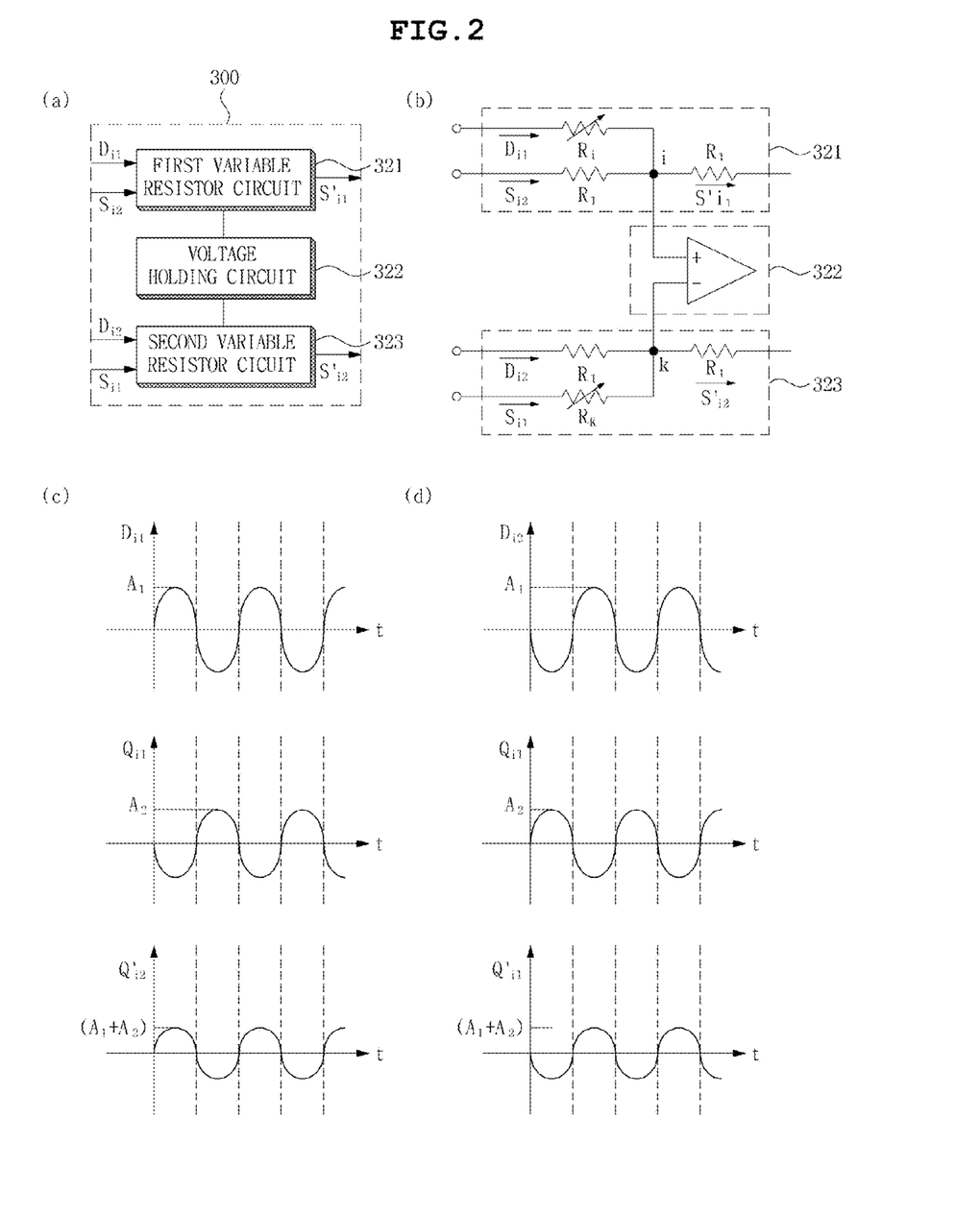
FIGS. 2(a) and 2(b) are a block diagram and a circuit diagram of a variable resistor module according to an embodiment of the present invention.
FIGS. 2(c) and 2(d) are views illustrating a combining relationship (or a mixing relationship) between a quadrature signal and a driving placement signal in first and second variable resistor circuits.
Figure 7:
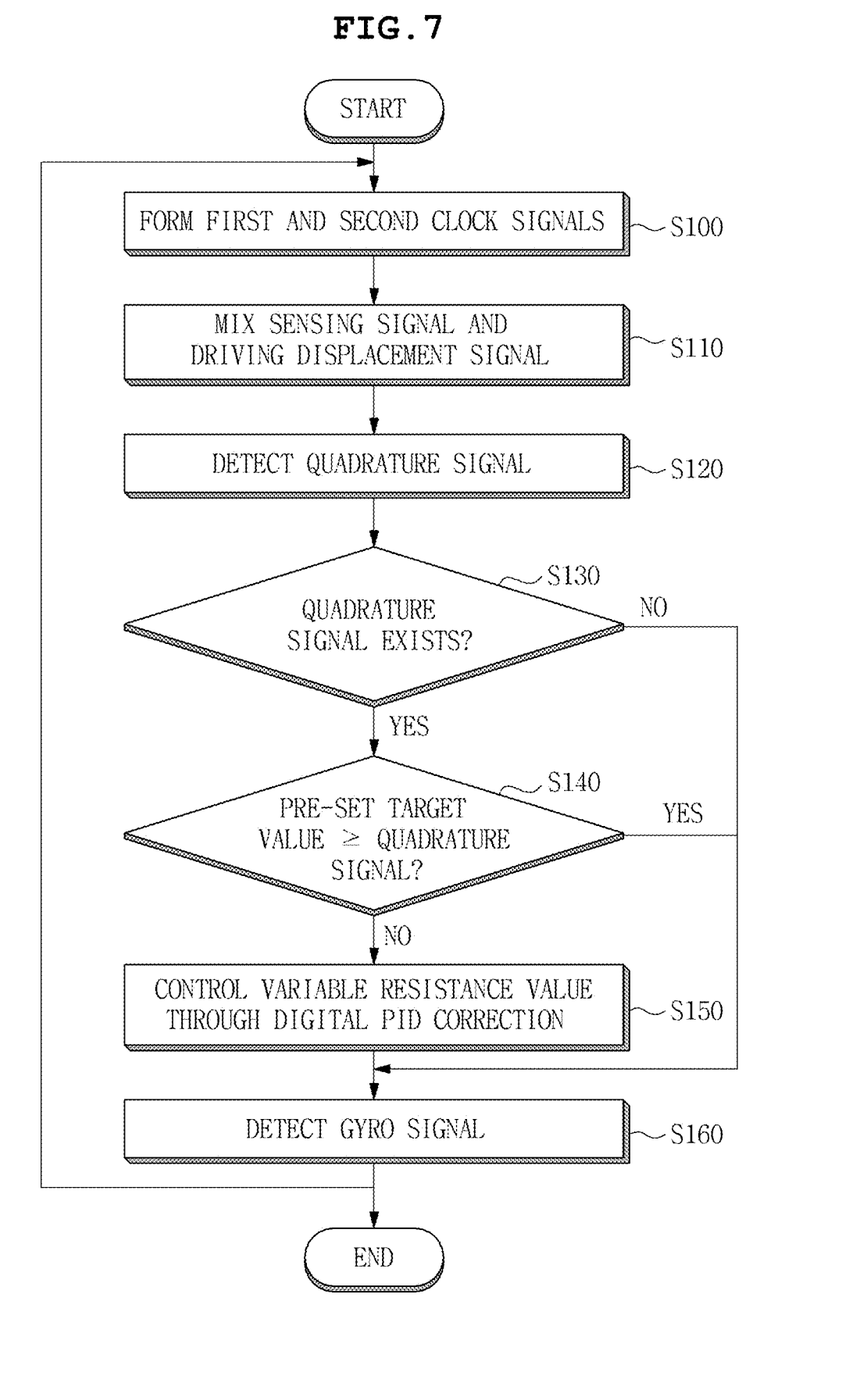
FIG. 7 is a flow chart illustrating a control method of an apparatus for driving a gyro sensor according to an embodiment of the present invention.

FIG. 1 is a block diagram of an apparatus for driving a gyro sensor 400 according to an embodiment of the present invention. FIGS. 2(a) and 2(b) are a block diagram and a circuit diagram of a variable resistor module 320 according to an embodiment of the present invention. FIG. 7 is a flow chart illustrating a control method of an apparatus for driving a gyro sensor 400 according to an embodiment of the present invention.

As illustrated in FIG. 1, an apparatus for driving a gyro sensor 400 according to an embodiment of the present invention includes a gyro sensor 400, a driving displacement signal processing unit 100, a sensing signal processing unit 300, and an automatic quadrature signal controller 200.

The gyro sensor 400 is a sensor that includes a driving mass (not shown) and detects an angular velocity in three axial directions positioned in a space. A driving signal (a pulse wave) applied from the driving displacement signal processing unit 100 vibrates the driving mass (not shown), and according to the vibration, a driving displacement signal (a sine wave) is output. Here, the driving displacement signal includes first and second driving displacement signals having a 180° phase difference therebetween.

The driving displacement signal processing unit 100 receives first and second driving displacement signals from the gyro sensor 400, generates first and second clock signals by using the first and second driving displacement signals, and subsequently applies a driving signal generated by using the second clock signal CLK_2 to the gyro sensor 400. The driving displacement signal processing unit 100 includes a first charge amplifier 110, a first clock generation module 120, a phase shifting unit 130, a second clock generation module 140, a driving signal generation module 150, and a first signal conversion module 160.

The first charge amplifier 110 converts changes in quantity of electric charge generated in first and second driving displacement electrodes (not shown) and transferred from the gyro sensor 400 into voltage signals, amplifies the voltage signals, and outputs first and second driving displacement signals.

The first clock generation module 120 outputs the first clock signal CLK_1 phase-locked to the first driving displacement signal, through a comparator, by using the first and second driving displacement signals. Namely, the first and second driving displacement signals are input to non-inverting and inverting terminals of the comparator, respectively, and by comparing the first and second driving displacement signals, the first clock signal CLK_1 is output (S100).

The second clock generation module 140 generates the second clock signal CLK_2 through the comparator by using a signal obtained by shifting a phase of the first driving displacement signal by 90° through the phase conversion unit 130 and a pre-set reference voltage $V_{CM}$. Namely, the signal obtained by shifting a phase of the first driving displacement signal by 90° and the pre-set reference voltage $V_{CM}$ are input to the non-inverting terminal and the inverting terminal of the comparator, respectively, and by comparing the signal obtained by shifting a phase of the first driving displacement signal by 90° and the pre-set reference voltage $V_{CM}$, the second clock signal CLK_2 is output (S100).

The driving signal generation module 150 generates a driving signal to be applied to the gyro sensor 400 by using amplitudes (voltages) with respect to the second clock signal CLK_2 output from the second clock generation module 140 and a driving signal capable of stably driving the gyro sensor 400 output from the first signal conversion module 160. Here, the driving signal may have a pulse wave, but the present invention is not limited thereto and the first signal conversion module may be a digital-to-analog converter (DAC).

The sensing signal processing unit 300 receives first and second sensing signals from the gyro sensor 400, generates third and fourth sensing signals by mixing the first and second sensing signals and the first and second driving displacement signals by using a variable resistor, and subsequently detects first and second gyro signals from the third and fourth sensing signals. The sensing signal processing unit 300 includes a second charge amplifier 310, a variable resistor module 320, a second synchronous detection module 330, a second filter module 340, and a third signal conversion module 350.

Here, the first and second sensing signals include first and second gyro signals and first and second quadrature signals, respectively, and the first and second quadrature signals have a phase difference of 180° therebetween.

The second charge amplifier 310 converts changes in a quantity of electric charge generated in the first and second sensing electrodes (not shown) and transferred from the gyro sensor 400 into voltage signals, amplifies the voltage signals, and subsequently outputs first and second sensing signals.

A sign selection module 170 is provided between the driving displacement signal processing unit 100 and the sensing signal processing unit 300, and maintains a phase difference between the driving displacement signal and the quadrature signal at 180°. Namely, when the driving displacement signal is phase-inverted by 180° and output, a phase difference between the first driving displacement signal and the second quadrature signal and that between the second driving displacement signal and the first quadrature signal may be maintained at 180°, respectively.

The variable resistor module 320 generates third and fourth sensing signals by mixing the first and second driving displacement signals to the first and second quadrature signals included in the first and second sensing signals by using a variable resistor circuit including a variable resistor (S110). Details thereof will be described below.

The second synchronous detection module 330 performs a demodulation process of mixing the third and fourth sensing signals and the second clock signal CLK_2, respectively, to detect first and second gyro signals in the form of predetermined DC values (S160). The second synchronous detection module 330 may include the second filter module 340 filtering out noise of the first and second gyro signals. Here, the second filter module 340 may be a low pass filter (LPF).

The third signal conversion module 350 converts the first and second gyro signals in the form of predetermined DC values output from the second filter module 340 into digital values (16 bits). Here, the third signal conversion module 350 may be an analog-to-digital converter (ADC).

The automatic quadrature signal controller 200 determines whether a quadrature signal is present in the third and fourth sensing signals (S130), and when a quadrature signal exists, the automatic quadrature signal controller 200 controls the variable resistor value through digital correction. The automatic quadrature signal controller 200 includes a first synchronous detection module 210, a first filter module 220, a second signal conversion module 230, and a quadrature control module 240.

Here, the third sensing signal includes the second gyro signal and a first quadrature compensation signal (a signal obtained by mixing the first driving displacement signal and the first quadrature signal), and the fourth sensing signal includes the first gyro signal and a second quadrature compensation signal (a signal obtained by mixing the second driving displacement signal and the second quadrature signal). The first and second quadrature compensation signals maintain a phase difference of 180° therebetween.

The first synchronous detection module 210 performs a demodulation process of mixing the third and fourth sensing signals and the first clock signal CLK_1, respectively, to detect first and second quadrature compensation signals in the form of predetermined DC values (S120). The first synchronous detection module 210 includes the first filter module 220 filtering out noise of the first and second quadrature compensation signals. Here, the first filter module may be an LPF.

The second signal conversion module 230 may convert the first and second quadrature compensation signals in the form of predetermined DC values output from the first filter module 220 into digital values (16 bits). Here, the second signal conversion module 230 may be an ADC.

The quadrature control module 240 compares the digital values of the first and second quadrature compensation signals with a pre-set target value (S140). When the digital values of the first and second quadrature compensation signals are less than the target value, the quadrature control module 240 adjusts a variable resistance value of the variable resistor circuit through digital correction through proportional integral control (PID) (S150). Details thereof will be described later. Here, the target value is a value minimizing the quadrature compensation signal, and it may be 0 in which the quadrature compensation signal does not exist.

Hereinafter, a scheme of mixing a quadrature signal and a driving displacement signal in the variable resistor module 320 according to an embodiment of the present invention will be described in detail.

FIGS. 2(a) and 2(b) are a block diagram and a circuit diagram of the variable resistor module 320 according to an embodiment of the present invention, and FIGS. 2(c) and 2(d) are views illustrating mixing relationship between a quadrature signal and a driving placement signal in the first and second variable resistor circuits.

As illustrated in FIG. 2(a), the variable resistor module 320 outputs third and fourth sensing signals by mixing the first and second driving displacement signals to the first and second sensing signals by using a variable resistor circuit. The variable resistor module 320 includes a first variable resistor circuit 321, a second variable resistor circuit 323, and a voltage holding circuit 322.

As illustrated in FIG. 2(b), the first variable resistor circuit 321 includes a first variable resistor $R_i$ and a first resistor $R_1$ connected to the first variable resistor $R_i$ in parallel. The first variable resistor circuit 321 outputs a current $S'_{i1}$ based on the third sensing signal (hereinafter, referred to as a 'third sensing signal current') obtained by mixing a current $D_{i1}$ based on the first driving displacement signal (hereinafter, referred to as a 'first driving displacement signal current') flowing in the first variable resistor $R_i$ and a current $S_{i2}$ based on the second sensing signal (hereinafter, referred to as a 'second sensing signal current') flowing in the first resistor $R_1$.

Here, the second sensing signal current $S_{i2}$ includes a current $Q_{i2}$ based on a second quadrature signal (hereinafter, referred to as a 'second quadrature current'), the third sensing signal current $S'_{i1}$ includes a current $Q'_{i2}$ based on a first quadrature compensation signal (hereinafter, referred to as a 'first quadrature compensation signal current'), and the first quadrature compensation signal current $Q_{i2}$ is a current obtained by mixing the first driving displacement signal current $D_{i1}$ and the second quadrature current $Q_{i2}$. The first driving displacement signal current $D_{i1}$ and the second quadrature current $Q_{i2}$ has a phase difference of 180° therebetween.

As illustrated in FIG. 2(c), an amplitude (size) of the first quadrature compensation signal current $Q'_{i2}$ included in the third sensing signal current obtained by mixing the first driving displacement signal current $D_{i1}$ having an amplitude $A_1$ through the first variable resistor circuit 321 and the second quadrature current $Q_{i2}$ having a phase-inverted amplitude $A_2$ is $A_1+A_2$. Thus, in order to minimize the amplitude (size) of the first quadrature compensation signal current $Q'_{i2}$, the amplitude of the first driving displacement signal current $D_{i1}$ is required to correspond to that of the second quadrature current $Q_{i2}$ by regulating the first variable resistor $R_i$. Details thereof will be described below.

As illustrated in FIG. 2(b), the second variable resistor circuit 323 includes a second variable resistor $R_k$ and a second resistor $R_1$ connected to the second variable resistor $R_k$ in parallel. The second variable resistor circuit 323 outputs a current $S'_{i2}$ based on the fourth sensing signal (hereinafter, referred to as a 'fourth sensing signal current') obtained by mixing a current $D_{i2}$ based on the second driving displacement signal (hereinafter, referred to as a 'second driving displacement signal current') flowing in the second variable resistor $R_k$ and a current $S_{i1}$ based on the first sensing signal (hereinafter, referred to as a 'first sensing signal current') flowing in the second resistor $R_1$.

Here, the fourth sensing signal current $S'_{i2}$ includes a current $Q'_{i1}$ based on the second quadrature compensation signal (hereinafter, referred to as a 'second quadrature compensation signal current'), and the second quadrature compensation signal current $Q'_{i1}$ is a current obtained by mixing the second driving displacement signal current $D_{i2}$ and the first quadrature current $Q_{i1}$.

As illustrated in FIG. 2(d), an amplitude (size) of the first quadrature compensation signal current $Q'_{i1}$ included in the fourth sensing signal current obtained by mixing the second driving displacement signal current $D_{i2}$ having an amplitude $A_1$ through the second variable resistor circuit 323 and the first quadrature current $Q_{i1}$ having a phase-inverted amplitude $A_2$ is $A_1+A_2$. Thus, in order to minimize the amplitude (size) of the second quadrature compensation signal current the amplitude of the second driving displacement signal current $D_{i2}$ is required to correspond to that of the first quadrature current $Q_{i1}$ by regulating the second variable resistor $R_k$. Details thereof will be described below.

The voltage holding circuit 322 is provided between the first and second variable resistor circuits to maintain the same voltage in an i node of the first variable resistor circuit 321 and a k node of the second variable resistor circuit 323. Here, the voltage holding circuit 322 may be a buffer (or an operational amplifier (OP-amp)).

As discussed above, in the driving circuit for processing an output signal from the gyro sensor 400, by reducing the amplitude of the quadrature signal by mixing the driving displacement signal with the sensing signal including the quadrature signal through the variable resistor module 320, noise generation between the quadrature signal that may be generated by jitter of the second synchronous detection module 330 and the second clock signal CLK_2 can be minimized, and thus, an SNR with respect to the output signal from the gyro sensor 400 can be secured.

Hereinafter, a process of detecting first and second quadrature signals in the automatic quadrature signal controller 200 according to an embodiment of the present invention will be described in detail with reference to FIGS. 3 and 4.

Figure 3:
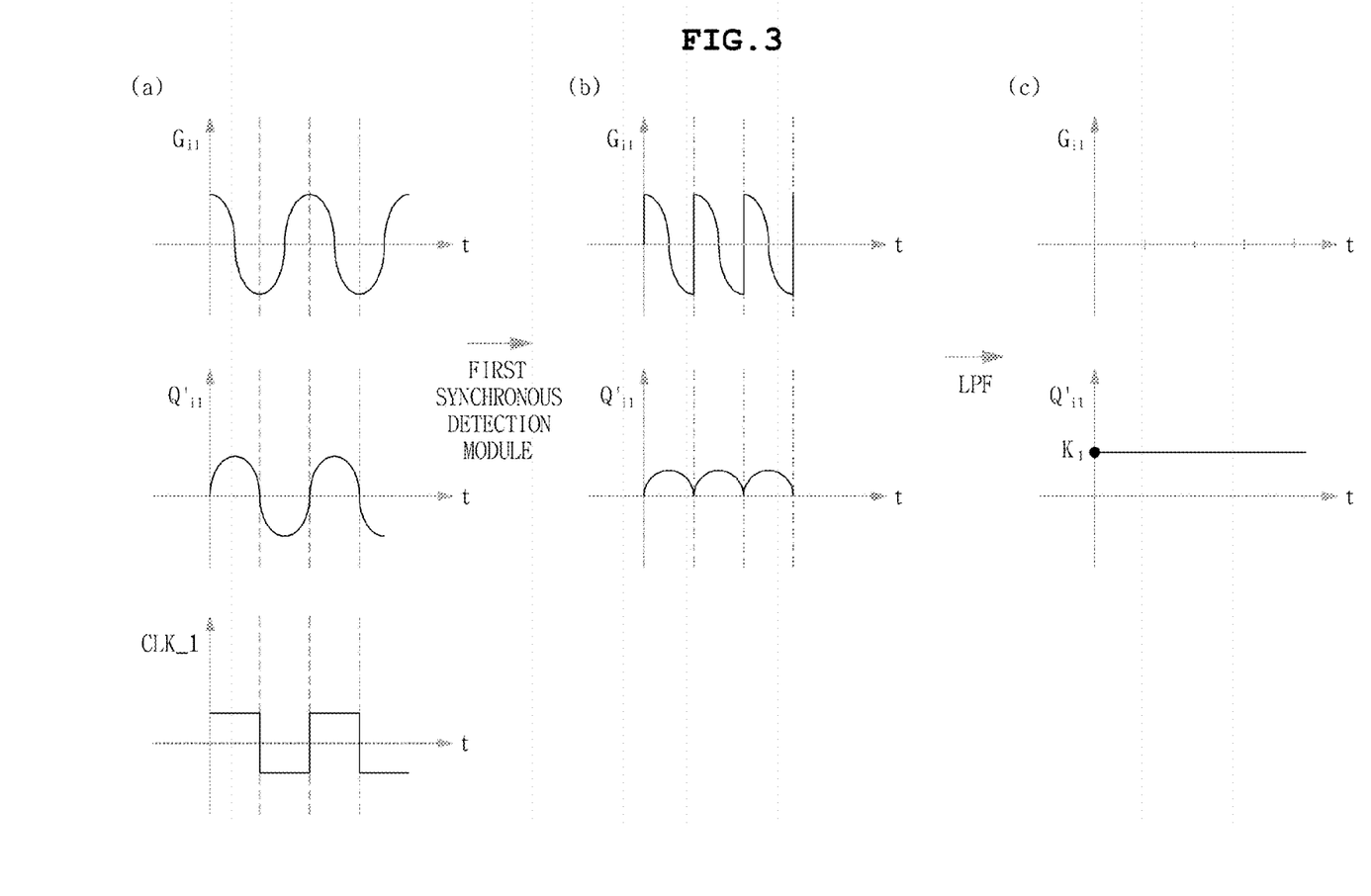
FIGS. 3 and 4 are views illustrating a process of detecting first and second quadrature compensation signals in an automatic quadrature signal controller according to an embodiment of the present invention.
Figure 4:
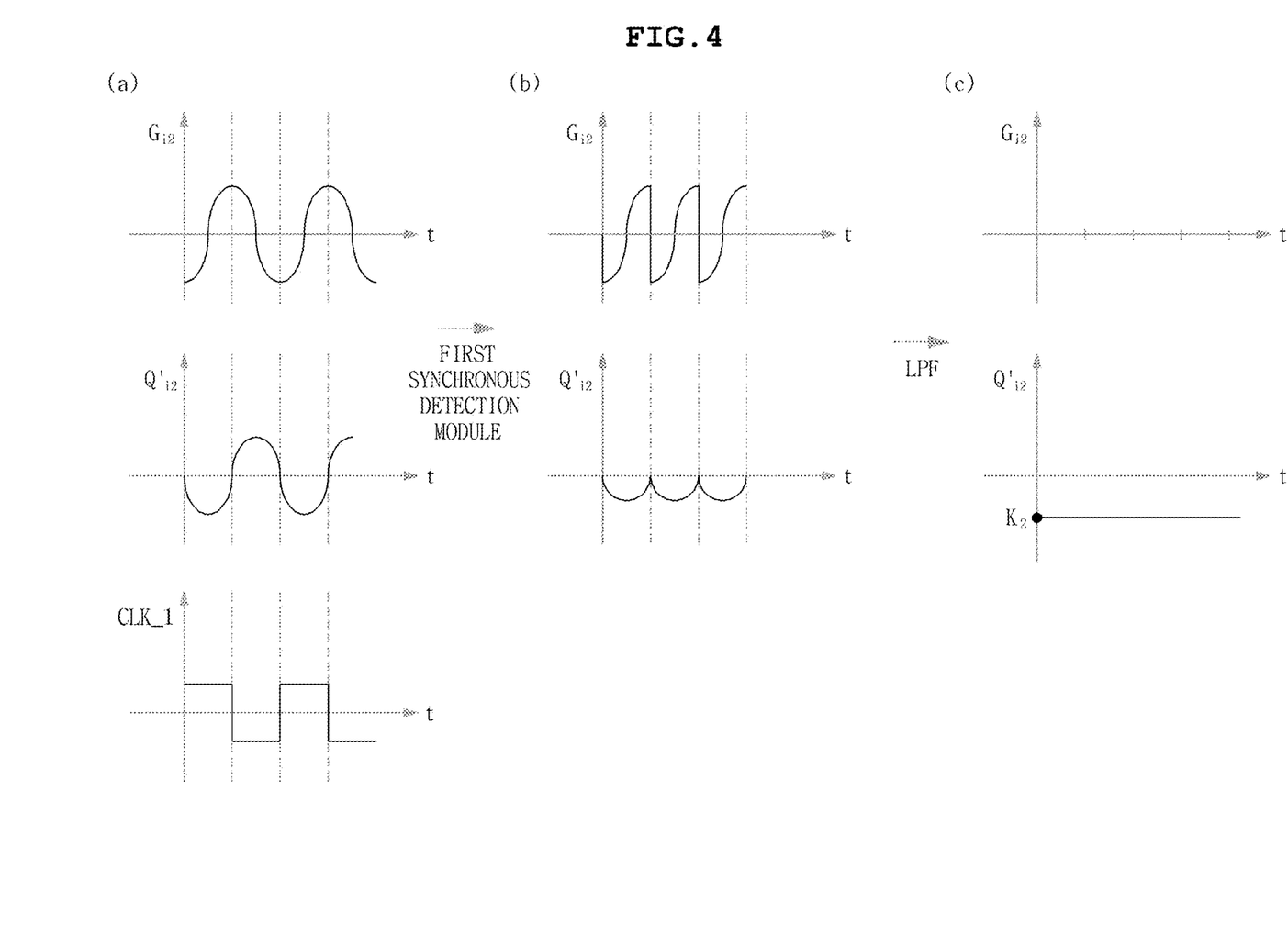

FIG. 3 is a view illustrating a process of detecting the first quadrature compensation signal in the automatic quadrature signal controller 200 according to an embodiment of the present invention, and FIG. 4 is a view illustrating a process of detecting the second quadrature compensation signal in the automatic quadrature signal controller 200 according to an embodiment of the present invention.

When the third sensing signal current $S'_{i1}$ is input from the first variable resistor circuit 321, the first synchronous detection module 210 mixes the first clock signal CLK_1 to a second gyro signal current $G_{i2}$ included in the third sensing signal current $S'_{i1}$ and the first quadrature compensation signal current $Q'_{i2}$, respectively (FIGS. 3(a) and 3(b)), performs a demodulation process of detecting a value $K_2$ of the first quadrature compensation signal current $Q'_{i2}$ in the form of a predetermined DC value by filtering (LPF) noise of the value of the first quadrature compensation signal current $Q'_{i2}$ through the first filter module 220, and subsequently converts the value $K_1$ of the first quadrature compensation signal current $Q'_{i2}$ in the form of the DC value into a digital value (16 bits) through the second signal conversion module 230 (FIG. 3(c)). Here, the second gyro signal current $G_{i2}$ may be removed by averaging through filtering (LPF).

When the fourth sensing signal current $S'_{i2}$ is input from the second variable resistor circuit 323, the first synchronous detection module 210 mixes the first clock signal CLK_1 to a first gyro signal current $G_{i1}$ included in the fourth sensing signal current $S'_{i2}$ and the second quadrature compensation signal current $Q'_{i1}$, respectively (FIGS. 4(a) and 4(b)), performs a demodulation process of detecting a value $K_1$ of the second quadrature compensation signal current $Q'_{i1}$ in the form of a predetermined DC value by filtering (LPF) noise of the value of the second quadrature compensation signal current $Q'_{i1}$ through the first filter module 220, and subsequently converts the value $K_1$ of the second quadrature compensation signal current $Q'_{i1}$ in the form of the DC value into a digital value (16 bits) through the second signal conversion module 230 (FIG. 4(c)). Here, the first gyro signal current $G_{i1}$ may be removed by averaging through filtering (LPF).

The quadrature control module 240 compares the digital values ($K_1$ and $K_2$ of the first and second quadrature compensation signals with a pre-set target value. When the digital values of the first and second quadrature compensation signals are less than the target value, the quadrature control module 240 adjusts a variable resistance value of the variable resistor circuit through digital correction through PID (S150). Here, the target value is a value minimizing the amplitudes ($K_1$ and $K_2$) of quadrature compensation signal, and, ideally, it may be 0 in which the quadrature compensation signal does not exist.

As discussed above, in the apparatus for driving the gyro sensor 400 according to an embodiment of the present invention, whether a quadrature signal is included in a sensing signal output from the gyro sensor 400 is monitored by the automatic quadrature signal controller in real time through the first synchronous detection module 210, or the like, and when a quadrature signal exists, digital correction is performed through PID to control a variable resistance value of the variable resistor module 320, thereby minimizing a generation of noise due to the quadrature signal due to a change in PVT of the control circuit or a degradation of the gyro sensor 400.

Hereinafter, a process of processing a quadrature compensation signal and a gyro signal in the sensing signal processing unit 300 will be described in detail with reference to FIGS. 5 and 6.

Figure 5:
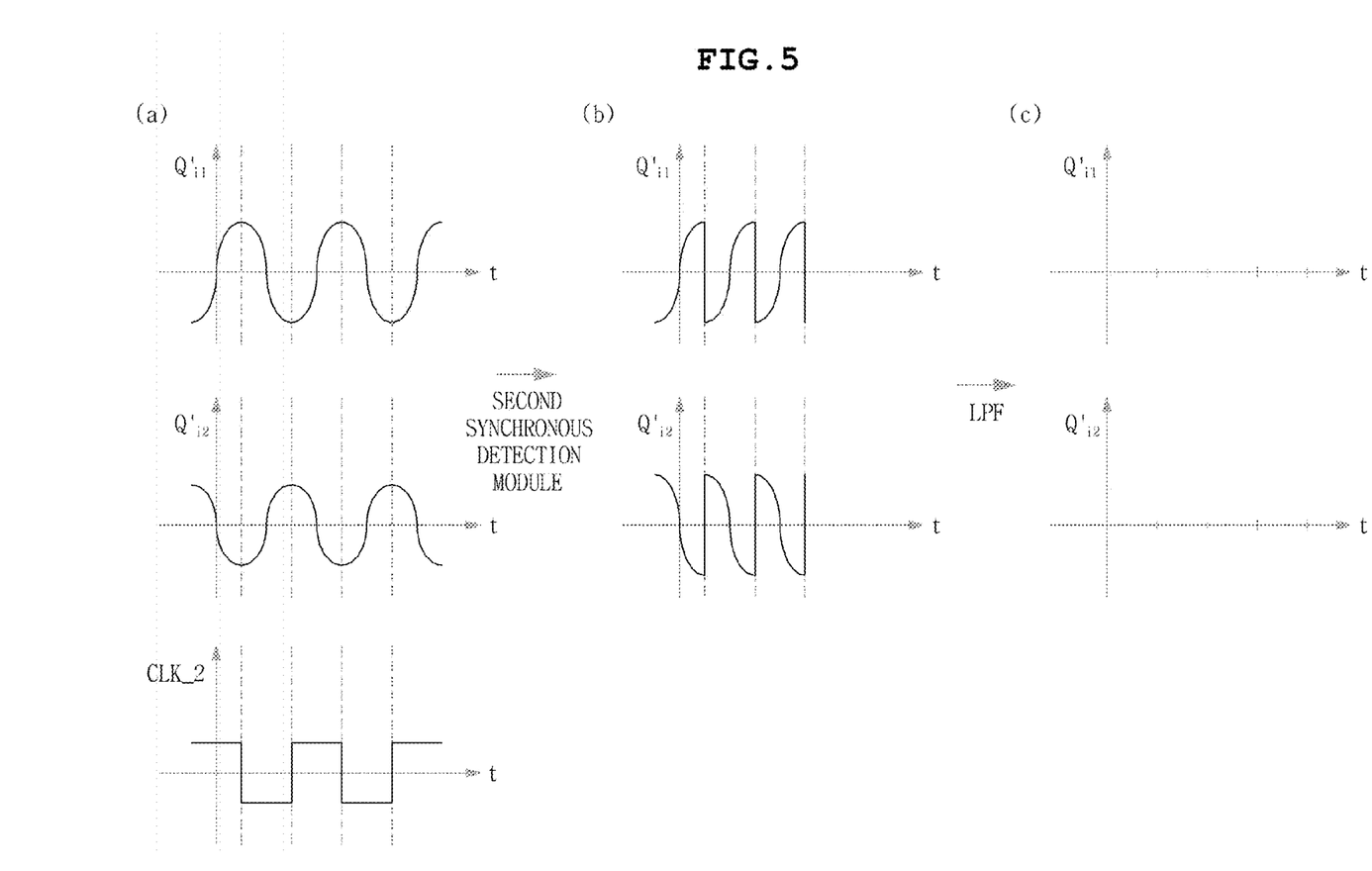
FIGS. 5 and 6 are views illustrating a process of processing a quadrature compensation signal and a gyro signal in a sensing signal processing unit according to an embodiment of the present invention.
Figure 6:
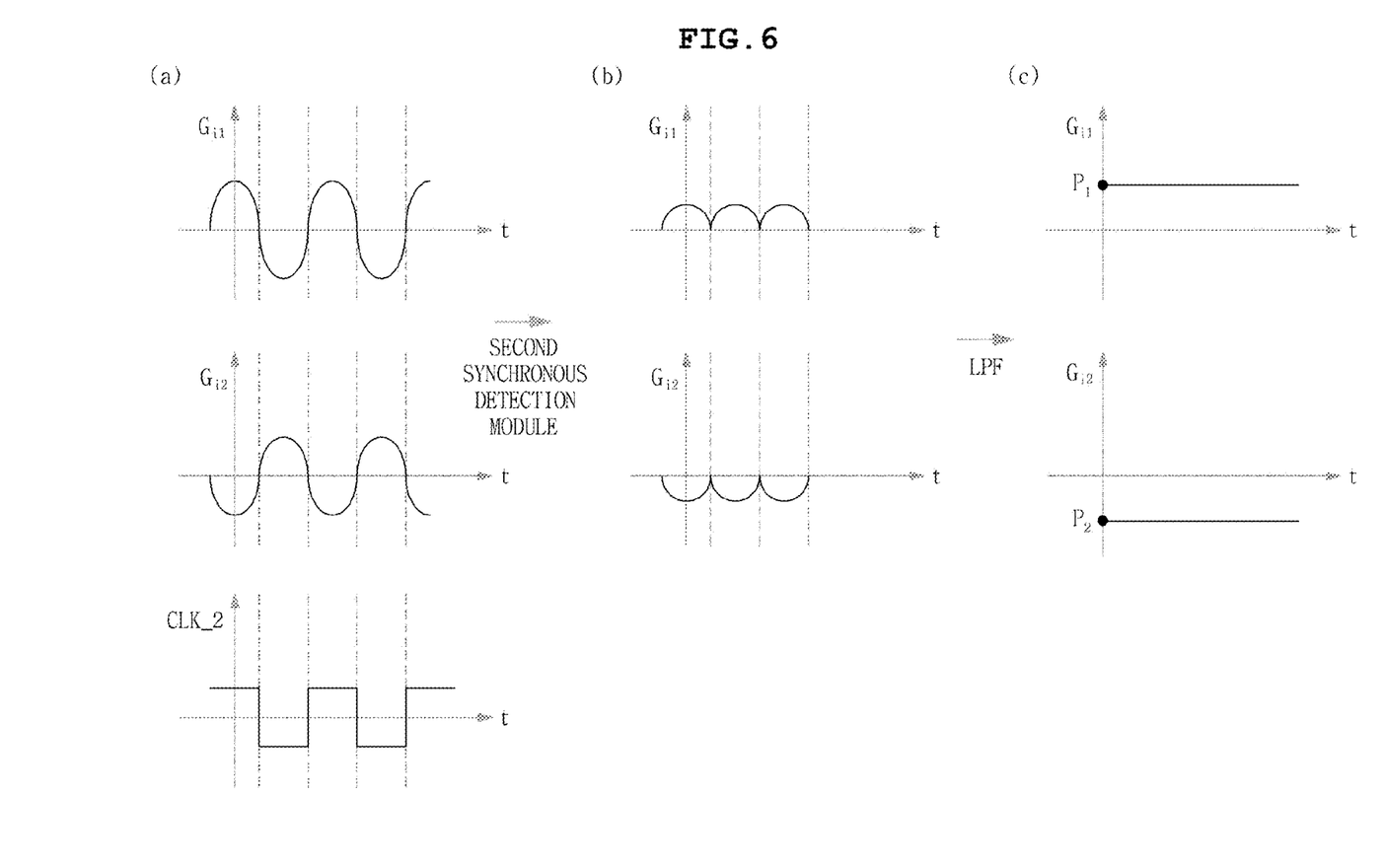

FIG. 5 is a view illustrating a process of processing a quadrature compensation signal in the sensing signal processing unit 300 according to an embodiment of the present invention, and FIG. 6 is a view illustrating a process of processing a gyro signal in the sensing signal processing unit 300 according to an embodiment of the present invention.

When third and fourth sensing signal currents are input from the first and second variable resistor circuits, the second synchronous detection module 330 mixes the second clock signal CLK_2 to the first quadrature compensation signal current $Q'_{i2}$ and the second quadrature compensation signal current $Q'_{i1}$ included in the third and fourth sensing signal currents, respectively (FIGS. 5(a) and 5(b)), performs a demodulation process of detecting values of the first and second quadrature compensation signal currents in the form of a predetermined DC value by filtering (LPF) noise of the first quadrature compensation signal current $Q'_{i2}$ and the second quadrature compensation signal current $Q'_{i1}$ values through the second filter module 340, and subsequently converts the DC values into digital values (16 bits) through the third signal conversion module 350 (FIG. 5(c)).

When third and fourth sensing signal currents are input from the first and second variable resistor circuits, the second synchronous detection module 330 mixes the second clock signal CLK_2 to the first and second gyro signal currents $G_{i1}$ and $G_{i2}$ included in the third and fourth sensing signal currents, respectively (FIGS. 6(a) and 6(b)), performs a demodulation process of detecting a value P1 of a first gyro signal current and a value P2 of the second gyro signal current in the form of predetermined DC values by filtering (LPF) noise of the first and second gyro signal currents $G_{i1}$ and $G_{i2}$ values through the second filter module 340, and subsequently converts the DC values $P_1$ and $P_2$ into digital values (16 bits) through the third signal conversion module 350 (FIG. 6(c)).

As discussed above, the first quadrature compensation signal current $Q'_{i2}$ and the second quadrature compensation signal current $Q'_{i1}$ may be removed through the demodulation process with the second clock signal CLK_2 and averaging through filtering (LPF) in the second synchronous detection module 330. However, in a case in which jitter is generated in the second clock signal CLK_2, noise may be generated due to combination with the first and second quadrature compensation signal currents $Q'_{i2}$ and $Q'_{i1}$. Thus, by minimizing the amplitude of the first and second quadrature compensation signal currents $Q'_{i2}$ and $Q'_{i1}$ through digital PID with respect to the variable resistance values $R_i$ and $R_K$ of the automatic quadrature signal controller 200, noise of the entire driving circuit may be reduced.

Also, a quadrature signal in the variable resistor module 320 provided in a front stage of the driving circuit of the gyro sensor 400 can be minimized through digital PID control of the quadrature signal by the automatic quadrature signal controller 200. Thus, by increasing an amplification gain of the second charge amplifier 310 provided in a front stage of the driving circuit, a generation of noise of the entire driving circuit can be minimized and an SNR of the gyro sensor 400 can be secured.

According to the embodiments of the present invention, in the control circuit for processing an output signal from the gyro sensor, by reducing the amplitude of the quadrature signal by mixing the driving displacement signal to the sensing signal including the quadrature signal through the variable resistor module, noise generation between the quadrature signal that may be generated by jitter of the second synchronous detection module and the second clock signal CLK_2 can be minimized, and thus, an SNR with respect to the output signal from the gyro sensor 400 can be secured.

Also, whether a quadrature signal is included in a sensing signal output from the gyro sensor is monitored by the automatic quadrature signal controller in real time through the first synchronous detection module, or the like, and when a quadrature signal exists, digital correction is performed through proportional integral control (PID) to control a variable resistance value of the variable resistor module, thereby minimizing a generation of noise due to the quadrature signal due to a change in PVT of the control circuit or a degradation of the gyro sensor.

Also, a quadrature signal in the variable resistor module provided in a front stage of the control circuit of the gyro sensor can be minimized through digital PID control of the quadrature signal by the automatic quadrature signal controller. Thus, a generation of noise of the entire control circuit can be minimized by increasing an amplification gain of the second charge amplifier provided in a front stage of the control circuit.

Although the embodiments of the present invention have been disclosed for illustrative purposes, it will be appreciated that the present invention is not limited thereto, and those skilled in the art will appreciate that various modifications, additions, and substitutions are possible, without departing from the scope and spirit of the invention.

Accordingly, any and all modifications, variations, or equivalent arrangements should be considered to be within the scope of the invention, and the detailed scope of the invention will be disclosed by the accompanying claims.

What is claimed is:

1. An apparatus for driving a gyro sensor, the apparatus comprising:
    a driving displacement signal processing unit configured to receive first and second driving displacement signals from a gyro sensor, generate first and second clock signals by using the first and second driving displacement signals, and subsequently apply a driving signal generated by using the second clock signal to the gyro sensor;
    a sensing signal processing unit configured to receive first and second sensing signals from the gyro sensor, generate third and fourth sensing signals by mixing the first and second sensing signals and the first and second displacement signals by using a variable resistor such that a quadrature signal included in the first and second sensing signals is reduced, and detect a gyro signal from the third and fourth sensing signals; and
    an automatic quadrature signal controller configured to determine whether a quadrature signal exists in the third and fourth sensing signals, control the variable resistor through digital correction when a quadrature signal exists, and minimize an amplitude of the quadrature signal.

2. The apparatus as set forth in claim 1, wherein the driving displacement signal processing unit generates the first clock signal phase-locked to the first driving displacement signal and the second clock signal obtained by shifting a phase of the first driving displacement signal by 90°, through a comparator.

3. The apparatus as set forth in claim 1, wherein the quadrature signal includes a first quadrature signal and a second quadrature signal,
    wherein the first quadrature signal is mixed with the second driving displacement signal having a phase difference of 180° therebetween and the second quadrature signal is mixed with the first driving displacement signal having a phase difference of 180° therebetween.

4. The apparatus as set forth in claim 1, further comprising:
    a sign selection module provided between the driving displacement signal processing unit and the sensing signal processing unit and configured to provide control such that the driving displacement signal and the quadrature signal mixed through the variable resistor have a phase difference of 180° therebetween.

5. The apparatus as set forth in claim 1, wherein when a quadrature signal exists, the automatic quadrature controller controls the variable resistance value through proportional integral control (PID).

6. The apparatus as set forth in claim 1, wherein the driving displacement signal processing unit includes:
    a first charge amplifier configured to convert the first and second driving displacement signals output from the gyro sensor into voltage signals, amplify the voltage signals, and subsequently output the same;
    a first clock generation module configured to output the first clock signal phase-locked to the first driving displacement signal through a comparator by using the first and second driving displacement signals;
    a phase conversion module configured to shift a phase of the first driving displacement signal by 90°;
    a second clock generation module configured to generate the second clock signal through a comparator by using a signal obtained by shifting the phase of the first driving displacement signal by 90° and a pre-set reference voltage;
    a first signal conversion module configured to determine an amplitude (voltage) with respect to a driving signal to be applied to the gyro sensor; and
    a driving signal generation module configured to generate a driving signal to be applied to the gyro sensor by using the second clock signal and the amplitude (voltage) with respect to the driving signal.

7. The apparatus as set forth in claim 6, wherein the first clock generation module is a comparator having a non-inverting terminal to which the first driving displacement signal is input and an inverting terminal to which the second driving displacement signal is input, and
    the second clock generation module is a comparator having a non-inverting terminal to which the signal obtained by shifting the phase of the first driving displacement signal by 90° is input and an inverting terminal to which the pre-set reference voltage is input.

8. The apparatus as set forth in claim 1, wherein the sensing signal processing unit includes:
a first charge amplifier configured to convert the first and second sensing signals output from the gyro sensor into voltage signals, amplifying the voltage signals, and subsequently output the same;
a variable resistor module configured to output third and fourth sensing signals obtained by mixing the first and second driving displacement signals to the first and second sensing signals by using a variable resistor circuit;
a second synchronous detection module configured to perform a demodulation process of mixing the third and fourth sensing signals and the second clock signal, respectively, to detect first and second gyro signals in a predetermined DC value form; and
a third signal conversion module configured to convert the first and second gyro signals into digital values.

9. The apparatus as set forth in claim 1, wherein the automatic quadrature signal controller includes:
a first synchronous detection module configured to perform a demodulation process of mixing the third and fourth sensing signals with the first clock signal, respectively, to detect first and second quadrature compensation signals;
a third signal conversion module configured to convert the first and second quadrature compensation signals into digital values; and
a quadrature control module configured to compare the digital values with a pre-set target value, and adjust a variable resistance value of the variable resistor circuit through PID when the digital values have not reached the target value.

10. The apparatus as set forth in claim 8, wherein the second synchronous detection module includes a first filter module configured to filter noise included in the first and second gyro signals.

11. The apparatus as set forth in claim 9, wherein the first synchronous detection module includes a second filter module configured to filter noise included in the first and second quadrature compensation signals.

12. The apparatus as set forth in claim 8, wherein the variable resistor module includes:
a first variable resistor circuit configured to include a first variable resistor and a first resistor connected in parallel and output a current based on the third sensing signal obtained by mixing a current based on the first driving displacement signal flowing in the first variable resistor and a current based on the second sensing signal flowing in the first resistor;
a second variable resistor circuit configured to include a second variable resistor and a second resistor connected in parallel and output a current based on the fourth sensing signal obtained by mixing a current based on the second driving displacement signal flowing in the second variable resistor and a current based on the first sensing signal flowing in the second resistor; and
a voltage holding circuit provided between the first and second variable resistor circuits and maintaining the same voltage in an i node of the first variable resistor circuit and a k node of the second variable resistor circuit.

13. A control method of an apparatus for driving a gyro sensor, the method comprising:
receiving first and second displacement signals from a gyro sensor and generating first and second clock signals by using the driving displacement signals;
receiving first and second sensing signals from the gyro sensor and mixing the first and second sensing signals with the first and second driving displacement signals by using a variable resistor to generate third and fourth sensing signals;
determining whether a quadrature signal exists in the third and fourth sensing signals, and when the quadrature signal exists, comparing the quadrature signal with a pre-set target value, and controlling the variable resistance value through digital correction; and
detecting first and second gyro signals from the third and fourth sensing signals.

14. The control method as set forth in claim 13, wherein the generating of the first and second clock signals includes:
generating the first clock signal phase-locked to the first driving displacement signal, through a comparator;
shifting a phase of the first driving displacement signal by 90°; and
generating the second clock signal by using the phase-shifted signal and a pre-set reference voltage, through the comparator.

15. The control method as set forth in claim 13, wherein the generating of the third and fourth sensing signals includes:
generating the third sensing signal by mixing the first displacement signal and the second sensing signal, through the first variable resistor circuit; and
generating the fourth sensing signal by mixing the second driving displacement signal and the first sensing signal, through the second variable resistor circuit.

16. The control method as set forth in claim 13, wherein the determining whether a quadrature signal exists and controlling a variable resistance value includes:
detecting the first and second quadrature compensation signals by mixing the third and fourth sensing signals and the first clock signal;
converting the first and second quadrature compensation signals into digital values;
comparing the digital values with a pre-set target value; and
when the digital values are greater than the target value, adjusting the variable resistance value through digital correction using proportional integral control (PID).

17. The control method as set forth in claim 13, wherein the detecting of the first and second gyro signals from the third and fourth sensing signals includes:
mixing the second clock signal to the third and fourth sensing signals, respectively, to detect first and second gyro signals in a predetermined DC value form; and
converting the first and second gyro signals into digital values.

* * * * *